(12) United States Patent
Guettler et al.

(10) Patent No.: US 7,186,351 B2
(45) Date of Patent: Mar. 6, 2007

(54) INJECTION VALVE

(75) Inventors: Herbert Guettler, Elchingen (DE);
Eberhard Holder, Kusterdingen (DE);
Gerhard Kroetz, Munich (DE); Martin Matt, Bruchsal-Untergrombach (DE);
Viktor Pfeffer, Ostfildern (DE)

(73) Assignee: DaimlerChrysler AG, Stuttgart (DE)

( * ) Notice: Subject to any disclaimer, the term of this patent is extended or adjusted under 35 U.S.C. 154(b) by 367 days.

(21) Appl. No.: 10/405,483

(22) Filed: Apr. 3, 2003

(65) Prior Publication Data

US 2003/0192960 A1  Oct. 16, 2003

Related U.S. Application Data

(62) Division of application No. 09/770,293, filed on Jan. 29, 2001, now Pat. No. 6,616,066.

(30) Foreign Application Priority Data

Jan. 29, 2000  (DE)  ................ 100 03 935
Oct. 28, 2000  (DE)  ................ 100 53 583

(51) Int. Cl.
*B31D 3/00* (2006.01)
*B05B 1/24* (2006.01)
*B05B 1/14* (2006.01)
*B05C 1/00* (2006.01)

(52) U.S. Cl. ............ 216/56; 239/136; 239/533.2; 239/585.1; 239/5; 239/462

(58) Field of Classification Search ........... 239/135, 239/136, 133, 88, 585.5; 210/500.1, 510.1, 210/502.1; 264/628; 268/DIG. 48; 392/386, 392/387, 396–98; 346/140, 75; 156/647, 156/567; 29/896.62, 896.6; 216/2, 56
See application file for complete search history.

(56) References Cited

U.S. PATENT DOCUMENTS 4,477,345 A * 10/1984 Szlaga, Jr. ............ 210/130

(Continued)

FOREIGN PATENT DOCUMENTS

DE  41 21 075 A1 * 1/1993  ............ 123/549

(Continued)

*Primary Examiner*—Kevin Shaver
*Assistant Examiner*—James S. Hogan
(74) *Attorney, Agent, or Firm*—Crowell & Moring LLP

(57) ABSTRACT

A method for producing a filter element includes forming longitudinal ducts extending between upstream and downstream surfaces of the filter element, and installing a heating element for heating regions of walls of the ducts along longitudinal extent of the walls. The filter element is arranged inside an injection valve of an internal combustion engine.

16 Claims, 3 Drawing Sheets

U.S. PATENT DOCUMENTS

| | | | |
|---|---|---|---|
| 4,639,748 A * | 1/1987 | Drake et al. | 347/67 |
| 4,898,142 A * | 2/1990 | Van Wechem et al. | 123/549 |
| 5,017,285 A * | 5/1991 | Janik et al. | 210/232 |
| 5,048,500 A | 9/1991 | Curhan | 123/549 |
| 5,050,569 A | 9/1991 | Beunk et al. | 123/549 |
| 5,179,927 A | 1/1993 | Henke et al. | 123/549 |
| 5,371,528 A * | 12/1994 | Izumida et al. | 347/87 |
| 5,400,969 A * | 3/1995 | Keene | 239/136 |
| 5,485,767 A * | 1/1996 | Ellis | 76/40 |
| 5,655,212 A * | 8/1997 | Sekhar et al. | 428/552 |
| 5,753,014 A * | 5/1998 | Van Rijn | 96/12 |
| 5,758,826 A | 6/1998 | Nines | 239/136 |
| 5,836,289 A * | 11/1998 | Thring | 123/549 |
| 5,937,887 A * | 8/1999 | Baxter et al. | 137/15.18 |
| 6,817,708 B2 * | 11/2004 | Kneezel | 347/93 |

FOREIGN PATENT DOCUMENTS

| | | |
|---|---|---|
| EP | 0 472 417 | 2/1992 |
| WO | WO 93/02284 | 2/1993 |

* cited by examiner

INJECTION VALVE

BACKGROUND AND SUMMARY OF THE INVENTION

The present application is a division of patent application Ser. No. 09/770,293, filed Jan. 29, 2001, now U.S. Pat. No. 6,616,066, the entire disclosure of which is incorporated herein by reference. Priority is claimed based on Federal Republic of Germany Patent Document Nos. 100 03 935.9, filed Jan. 29, 2000, and 100 53 583.6, filed Oct. 28, 2000, the disclosures of which are expressly incorporated by reference herein.

BACKGROUND AND SUMMARY OF THE INVENTION

The invention relates to an injection valve for internal combustion engines, with a filter element arranged on the inside of the injection valve in the fuel flow of the latter and having ducts for the fuel.

Patent literature (WO 93/02284, EP 0472 417 A1, U.S. Pat. No. 5,050,569, U.S. Pat. No. 5,758,826 or U.S. Pat. No. 5,179,927) discloses a series of injection valves of this type which are also provided for the heating of fuel prior to injection into the combustion space of internal combustion engines. However, all the approaches used here for heating the fuel are distinguished by a comparatively large mass to be preheated. They therefore all have a high energy consumption and a long response time>60 s.

An object of the invention is to develop an injection valve and a method, by means of which, particularly when the engine is cold, improved mixture formation and as small a fraction as possible of CH in the exhaust gas during the starting phase can be achieved.

This object of the invention is achieved by providing an injection valve for internal combustion engines, with a filter element arranged on the inside of the injection valve in the fuel flow of the latter and having ducts for the fuel, wherein the filter element is designed as a throughflow heating element, and wherein the walls of the throughflow ducts are capable of being heated, at least in certain regions, along their longitudinal extent. The invention is distinguished by an extremely reduced thermal mass of the filter element which is embodied as a heating element. As a result, the response time for heating is reduced to a few seconds and the peak energy consumption is minimized (200 W→20 W).

Thus, in particular, by virtue of the use of semiconductor material such as silicon as heater material and the shaping of the latter by means found in microsystem or semiconductor technology such as anisotropic etching, it is possible to produce very large surfaces (inner surface>300 $cm^2$ in the case of a heater area of 1 $cm^2$) for the exchange of energy between the fuel and the heating element. According to an embodiment of the invention, the semiconductor material is noncrystalline. The semiconductor material may also include conductive aluminum.

PTC resistors have hitherto been used as heating elements and they maintain a fixed surface temperature of the heater without external regulation. On account of this, it has not been possible hitherto to regulate the heating capacity in an active way. This means that it is impossible to regulate the heating capacity, for example so as to adapt to varying fuel properties or quantities.

By contrast, the present invention makes it possible to have rapid response times in the seconds range, so that the heating element can be designed with out the disadvantage of additional waiting times.

Furthermore, the heating elements according to the invention are so small that they can be integrated into a conventional injection valve, specifically without the external dimensions of the injection valve having to be changed.

In order to measure the heating function of a filter element according to the invention, heptane, on the one hand, and water, on the other hand, were conveyed through the latter. The respective filter element had a diameter of approximately 10 mm. The diameter of a web between two adjacent ducts amounted to approximately 20 µm, the duct length to approximately 300 µm and the duct diameter to approximately 90 µm.

In this filter element, it was possible to achieve a maximum throughflow of about 870 l/h at a water pressure of 6 bar. The achievable heating capacities were between 13 and 35 Watt.

With this set of parameters and a throughflow of about 2 l/h, it was possible for the liquid conveyed through to be heated by 30 to 50° C. within 10 s to 20 s.

Surprisingly, despite its crystalline and therefore brittle material, the filter element did not exhibit any impairments in the case of fluctuations in the pressure of the liquid conveyed through. Consequently, also surprisingly, the mechanical stress on the material of a filter element according to the invention due to a slight pressure drop in a duct is uncritical and, in general, negligible.

Furthermore, local overheating possibly occurring within a duct can be ignored, since the heat in the filter element is distributed very quickly on account of the high thermal conductivity of the semiconductor material.

Expediently, an inventive, in particular semiconducting filter element can be used not only for heating, but also as a temperature sensor. For this purpose, preferably, the electrical resistance of the filter element developed as a heating element is determined (preferably when it is not heated) and is compared with an (in particular, predetermined) characteristic curve representing the temperature and/or resistance profile.

The relation between the fuel temperature and the electrical heating capacity makes it possible, by intelligent evaluation, to obtain further information, for example on the boiling point of the fuel and consequently, inter alia, the quality of the latter.

This possibility is based, inter alia, on the fuel forming bubbles at the boiling point. As a result of this bubble formation, the transmission of heat from the filter element into the fuel is lower. Consequently, the filter element is subject to greater specific heating, which can be detected not only from a certain temperature rise, but, for example, also from a significant change in the current/voltage characteristic curve and therefore also in the delivered heating capacity.

In this case, that is to say at the start of bubble formation due to the evaporation of the fuel, the measured heating capacity, preferably determined from the current/voltage graph, deviates from a theoretical value of the heating capacity which would occur in the case of a uniform transmission of heat into the fuel. To prevent evaporation, the heating capacity can then be reduced, for example, at least by an amount which causes the measured heating capacity to be again within a predeterminable range of the theoretical heating capacity.

In a simple way, in order to determine the boiling point, in particular the temperature of the filter element can be measured, at least indirectly, since the evaporation of the fuel is associated with rapid or sudden temperature rise of the filter element. A lowering of the temperature by several degrees was observed experimentally at the boiling point of the fuel.

By means of each of these simple measures, the fuel can be heated, regardless of its respective composition, up to or just before its boiling point, as a result of which, in particular, pollutant emission during a cold-starting phase is permanently improved.

Since the boiling point of the fuel used depends on its composition or quality, the pressure and the temperature, etc., this is particularly advantageous, since heating, of course, takes place solely to, at most, the actual boiling point of the fuel flowing through the filter element at a given time.

Furthermore, by means of the filter element according to the invention, in particular by a comparison with predetermined calibrating curves, for example, the following variables can also be determined:

I) the fuel flow in relation to the cooling of the filter element during the throughflow of fuel,
II) the fuel quality by determining the boiling point of the fuel, and
III) the pressure in the fuel system by means of a pressure displacement of the boiling point.

By means of the filter element according to the invention in the injection valve, in addition to the behaviour during cold starting being optimized, improvements can also be achieved in use during normal operation.

Thus, in particular, in a direct-injection petrol engine, a check of mixture formation in the combustion space, for example by controlling the depth of penetration of the fuel, that is to say controlled variation or keeping it constant in the case of different fuel compositions, is of substantial interest.

The heating or overheating of the pressurized fuel in the injection valve allows an explosive atomization of the fuel in the event of a pressure drop; that is to say during the opening of the needle of the injection valve.

Thus, the thermal control of fuel made possible by the invention has the same effects in terms of jet pattern and depth of penetration as other solutions of substantially more complicated design, such as, for example, electrostatic droplet-influencing devices or mechanically adjustable swirl plates in the vicinity of the valve orifice.

Further expedient refinements may be found in the subclaims. Moreover, the invention is explained in more detail with reference to exemplary embodiments illustrated in the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
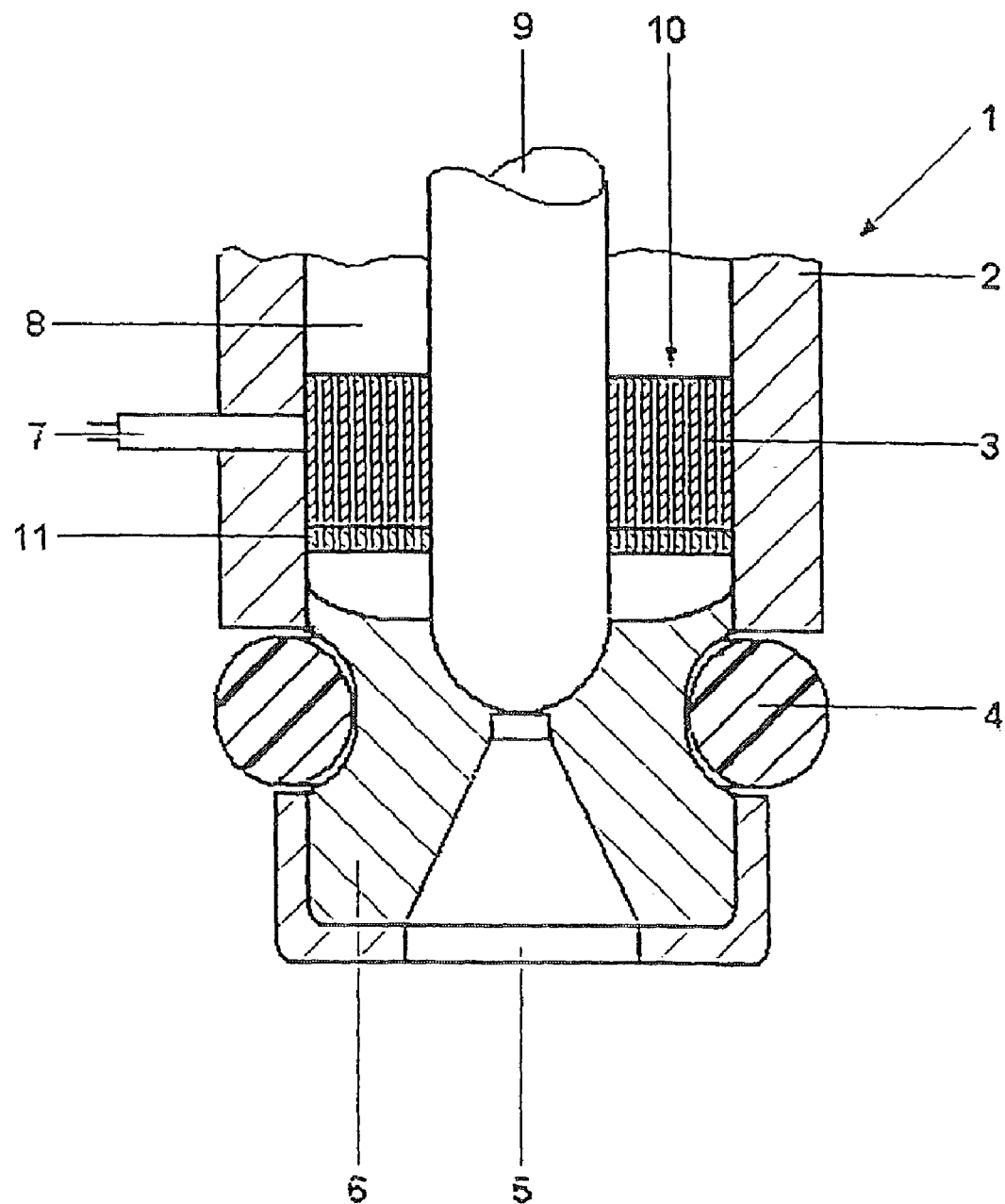
FIG. 1 shows a detail of a cross section through an injection valve constructed according to a preferred embodiment of the present invention.

FIG. 1 illustrates a detail of an injection valve 1 in cross section, the detail showing the discharge-side end region of the injection valve 1. The injection valve 1 has a housing 2, into which an insert 6 is pushed on the discharge side.

The insert 6 has a seal 4 on its casing. A frustoconical outflow orifice 5 for the fuel is introduced into the insert 6 on the discharge-side end face. Arranged on the opposite (inflow-side) end face is a valve seat, on which a valve needle 9 of the injection valve 1 can be laid in a seal-forming fashion.

Furthermore, the remaining surface of the inflow-side end face of the insert 6 is shaped in such a way that it has a termination with as low a flow resistance as possible for the fuel inflow duct 8 arranged concentrically around the valve needle 9.

A filter element 10 is arranged in the inflow duct 8, likewise concentrically around the valve needle 9. The filter element 10 is supported on the outflow side by a perforated plate 11, preferably made from metal.

The filter element 10 is manufactured from a semiconducting material, preferably from silicon. The ducts 3 for the fuel flowing through are introduced in a simple and cost-effective way by means of one or more etching methods known from semiconductor technology, such as anisotropic etching.

In order to heat the filter element 10, the latter is supplied with current from outside via a line 7. In this case, it is expedient to connect the line 7 to the positive pole and the filter element 10 directly to electrical ground via the housing 2 of the injection valve 1.

Figure 2:
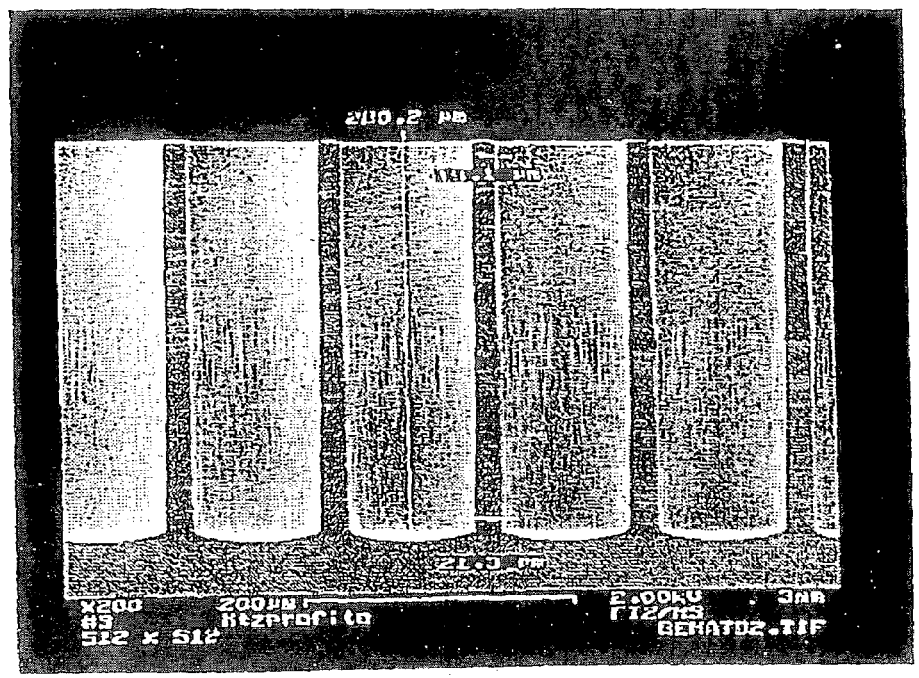
FIG. 2 shows the start of a structurally etched filter element for use with the invention with an aspect ratio greater than 10:1.
Figure 3:
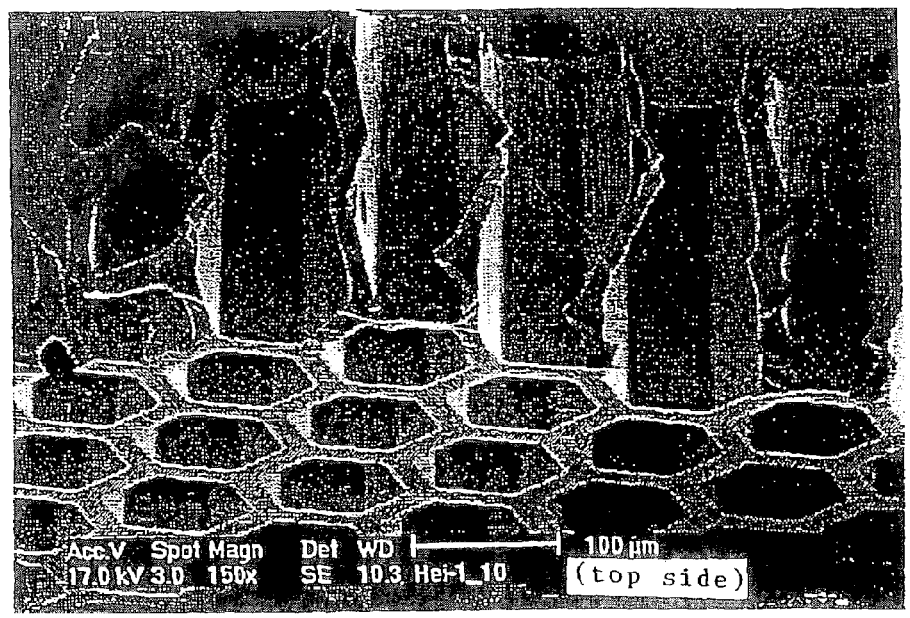
FIG. 3 shows an enlargement of a filter element for use with the invention.

FIG. 2 illustrates a microscopic photograph of a filter element, the structure of which is not yet ready-etched fully. A three-dimensional image of a completely etched filter element is illustrated in FIG. 3. The aspect ratio, that is to say the quotient, of half the web width to the corresponding web length is greater than 1:10 here.

It is also clear, inter alia, from FIGS. 2 and 3 that the walls of the ducts themselves are virtually smooth in this enlargement. This could, inter alia, be a reason for the low flow resistance and therefore for the good pressure stability of the filter element.

Figure 4:
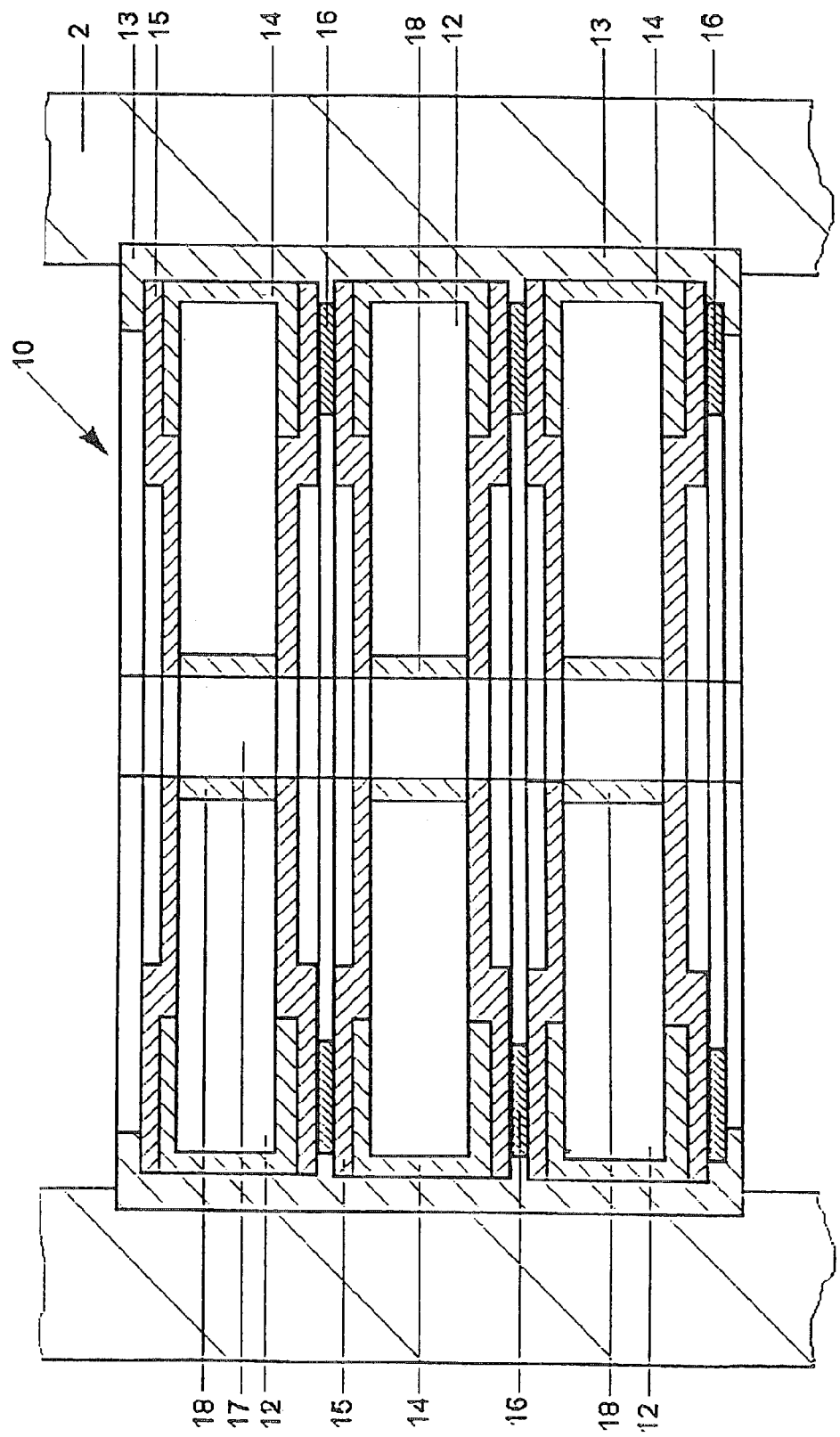
FIG. 4 shows a stacked structure of a filter element for use with invention composed of a plurality of semiconductor wafers.

FIG. 4 illustrates a filter element 10' which is formed from a plurality of semiconductor boards 12. The individual semiconductor boards 12 are arranged in alignment one behind the other in the direction of flow of the fuel.

The individual semiconductor boards 12 all have the ducts illustrated in FIGS. 2 and 3. In order to reduce the flow resistance, the ducts are expediently likewise oriented in alignment one behind the other in the direction of flow of the fuel.

The semiconductor boards 12 have, at their center, a drilled hole 17 which serves for leading through the valve needle 9. Each semiconductor board 12 has, on its inner wall facing the valve needle 9, an electrically insulating valve-needle guide ring 18. The valve-needle guide rings 18 expediently seal off the valve needle 9 fluidically in relation to the semiconductor boards 12.

The semiconductor boards 12 are both surrounded, along the edge, by a ring-like filter housing 13 which, on the one hand, holds the semiconductor boards 12 together and at the same time insulates them thermally in relation to the housing 2 of the injection valve 1.

Furthermore, each semiconductor board 12 has a closed insulating ring 14 arranged along the edge. An insulating ring 14 is manufactured from an electrically insulating material and engages in a C-shaped manner around the edge of a semiconductor wafer 12.

The insulating ring 14 is advantageous, in particular, because less or even no liquid flows through in the edge region of a semiconductor board 12, so that, without the insulating ring 14, the edge region of this semiconductor board 12 could heat up excessively. However, due to excessive heating, the resistance in this region would fall, with the result that the current required for heating would then flow out through the edge region.

The surfaces of an insulating ring 14 which face away from the end faces of the semiconductor boards 12, which are round here, are coated with a metallic conductor, preferably aluminum. That surface of a semiconductor board 12 which is located outside an insulating ring 14 is likewise coated correspondingly. The metallic coating of an insulating ring 14 and the coating of the surface of a semiconductor board 12 together form a closed conductor layer 15. By contrast, the outer surfaces of the insulating rings 15 do not have any electrically conductive coating.

By virtue of this design, it is possible to conduct a heating current through a semiconductor board 12 and thereby heat the latter in a controlled manner. The heating current is conveyed through a semiconductor board 12 preferably in a controlled way.

To form electrical contact with the filter element 10, the positive pole is expediently applied directly to one of the two outer, that is to say end-face conductor layers 15, while the other corresponding outer conductor layer 15 is connected to the housing 2 of the injection valve 1, and consequently to electrical ground, if appropriate via or with the interposition of an electrical leadthrough ring 16 described later. In this way it is possible, for example, to have, inter alia, a simple embodiment of an injection valve of this type.

By virtue of the current, which can be conveyed in a controllable manner through the semiconductor boards 12, or of the applied voltage, it is possible that the heating of the semiconductor wafers 12 and consequently of the liquid, preferably fuel, flowing through can be controlled quantitatively. As a result of this controlled heating of the liquid, the fuel can at any time be conditioned in terms of its temperature within the limits predetermined by the system. Improved thermal conditioning gives rise, in turn, to better exhaust-gas behaviour, in particular during the cold-starting phase of an engine.

As already mentioned, a leadthrough ring 16 is also arranged on one end face of the filter element 10 and between two semiconductor boards 12. The leadthrough ring 16 is manufactured from an electrically conductive material. The leadthrough rings 16 arranged between two semiconductor boards 12 serve for connecting two semiconductor boards 12 electrically to one another. In the present case, the leadthrough ring 16 arranged on the end face of the filter element 10 serves for the electrical connection of the corresponding outer semiconductor board 12 to electrical earth.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for producing a filter element for an injection valve of an internal combustion engine comprising:
   selecting a nonporous semiconductor material for the filter element; and
   forming linear parallel longitudinally extending fluid flow ducts through the semiconductor material.

2. Method according to claim 1, wherein the ducts are etched anisotropically.

3. Method according to claim 1, wherein the semiconductor selected is silicon.

4. Method according to claim 1, wherein the step of forming linear ducts in the semiconductor includes forming longitudinal ducts extending between upstream and downstream surfaces of the filter element.

5. Method of producing a filter element arranged inside an injection valve of an internal combustion engine, comprising:
   selecting a nonporous material for the filter element;
   forming linear parallel longitudinally extending ducts through said nonporous material, said ducts extending between upstream and downstream surfaces of the filter element; and
   providing heating means for heating regions of walls of the ducts along a longitudinal extent of the walls.

6. Method according to claim 5, further comprising making the filter element at least partially from a semiconducting material at least in a vicinity of fuel flow.

7. Method according to claim 6, wherein the semiconducting material includes silicon.

8. Method according to claim 6, wherein the semiconducting material includes conductive aluminum metal.

9. Method according to claim 5, further comprising installing a perforated stabilizing plate, through which fuel can flow, wherein:
   said stabilizing plate is made from a metal; and
   said stabilizing plate is arranged on an outflow side of the filter element.

10. Method according to claim 5, further comprising:
    forming said filter element with a plurality of semiconductor plates arranged one behind the other; and
    providing the semiconductor boards with said linear longitudinal ducts.

11. Method according to claim 5, further comprising thermally insulating the filter element in relation to a housing of the injection valve.

12. The method according to claim 1, further comprising:
    forming said filter element with a central opening having a size which is selected to accommodate and contact a valve needle of said injection valve.

13. The method according to claim 12, further comprising:
    forming said filter element with a perimeter having a size and shape which are selected to correspond to a size and shape of a fuel inflow duct of said injection valve.

14. The method according to claim 5, further comprising:
    forming said filter element with a central opening having a size which is selected to accommodate and contact a valve needle of said injection valve.

15. The method according to claim 14, further comprising:
    forming said filter element with a perimeter having a size and shape which are selected to correspond to a size and shape of a fuel inflow duct of said injection valve.

16. The method according to claim 1, wherein said semiconductor is monocrystalline silicon.

* * * * *